(12) United States Patent
Munk-Hansen

(10) Patent No.: US 8,920,120 B2
(45) Date of Patent: Dec. 30, 2014

(54) ARRANGEMENT WITH A NACELLE AND A RADIATOR ARRANGEMENT

(75) Inventor: Thorkil Munk-Hansen, Give (DK)

(73) Assignee: Siemens Aktiengesellschaft, Munich (DE)

( * ) Notice: Subject to any disclaimer, the term of this patent is extended or adjusted under 35 U.S.C. 154(b) by 834 days.

(21) Appl. No.: 12/942,089

(22) Filed: Nov. 9, 2010

(65) Prior Publication Data

US 2011/0123336 A1    May 26, 2011

(30) Foreign Application Priority Data

Nov. 24, 2009 (EP) .................................. 09014633

(51) Int. Cl.
F03D 11/00 (2006.01)
F03D 1/00 (2006.01)

(52) U.S. Cl.
CPC ............... *F03D 11/00* (2013.01); *F03D 1/001* (2013.01); *F03D 1/005* (2013.01); *Y02E 10/722* (2013.01); *Y02E 10/725* (2013.01); *Y02E 10/726* (2013.01); *Y02E 10/728* (2013.01)
USPC ....................................................... 416/95

(58) Field of Classification Search
CPC ......... F03D 1/001; F03D 1/005; F03D 11/00; Y02E 10/722; Y02E 10/725; Y02E 10/726; Y02E 10/728

USPC ................................................... 416/142, 95
See application file for complete search history.

(56) References Cited

U.S. PATENT DOCUMENTS

| 1,549,202 | A | | 8/1925 | McClane |
| 2,065,789 | A | * | 12/1936 | Bolsinger ........................ 237/59 |
| 5,732,765 | A | | 3/1998 | Drolen |
| 2010/0034653 | A1 | * | 2/2010 | Frokjaer ......................... 416/39 |

FOREIGN PATENT DOCUMENTS

| CN | 201328522 Y | 10/2009 |
| DE | 4130763 A1 | 3/1993 |
| DE | 102007042338 A1 | 3/2009 |
| EP | 1835128 A2 | 9/2007 |
| JP | 2003214325 A | 7/2003 |
| WO | WO 2008131766 A2 | 11/2008 |

OTHER PUBLICATIONS

Communication from A J Park, Jun. 21, 2011, pp. 1-4.

* cited by examiner

*Primary Examiner* — Edward Look
*Assistant Examiner* — Jeffrey A Brownson

(57) ABSTRACT

An arrangement with a nacelle and a radiator arrangement of a wind turbine is provided. The radiator arrangement includes a guiding assembly. The nacelle includes a guiding assembly, too. The guiding assembly of the radiator is positioned and constructed in a way that the guiding assembly interacts with the guiding assembly of the nacelle. Thus, the radiator arrangement is lifted and passed to a final position on top of the nacelle by the engaged guiding assemblies.

10 Claims, 3 Drawing Sheets

ARRANGEMENT WITH A NACELLE AND A RADIATOR ARRANGEMENT

CROSS REFERENCE TO RELATED APPLICATIONS

This application claims priority of European Patent Office Application No. 09014633.3 EP filed Nov. 24, 2009, which is incorporated by reference herein in its entirety.

FIELD OF INVENTION

The invention relates to an arrangement with a nacelle of a wind turbine and with a radiator, which is arranged on top of the nacelle.

BACKGROUND OF INVENTION

The radiator is connected with the outer surface of the nacelle and is used to radiate heat, which is generated inside the nacelle to the ambient air.

The transport of wind turbine components is a challenge due to the physical dimensions of the components. Especially nacelles used for an offshore site may show a length up to 12 meters or more and a diameter up to 5 meters.

For a transportation on roads it is necessary, to plan the road-connection carefully, as a transport-vehicle has to circumvent or has to cope with all barriers like curves, tunnels, bridges, traffic lights, etc.

One example is the Elbe-tunnel, which is close to Hamburg, Germany. The tunnel shows a minimum height of 4.20 m, thus a transported component and the used vehicle has to comply with this height.

In Europe a standard height of new bridges is 4.50 m, but there are many older bridges, which show a lower height of clearance.

Thus the transport vehicle and the transported component have to be constructed in a way that they comply with all of those traffic barriers or traffic restrictions along the way to a planned site for the wind turbine.

Thus the construction of wind turbine components with a high diameter is limited in a certain way.

It is well-known that a radiator is arranged on top of a wind turbine. Due to the transport limitations the radiator and the nacelle are transported separately to the planned site.

At the site the radiator is placed on top of the nacelle with a crane. Next the radiator has to be connected with the nacelle by personal. For the position-work and for the connection-work the personal have to leave the nacelle.

A nacelle of a modern wind turbine has a typical diameter of 4 meters or more. Thus the installation work on top of the nacelle is dangerous, even if the installation work is done while the nacelle is placed on the ground.

SUMMARY OF INVENTION

It is an object of the present invention to provide an improved arrangement, which allows the personal to work simply and safely.

This object is achieved by an arrangement according to the independent claim. Preferred configurations are object of the dependent claims.

The arrangement contains a nacelle and a radiator of a wind turbine. The radiator arrangement contains a guiding assembly. The nacelle contains a guiding assembly, too. The guiding assembly of the radiator is positioned and constructed in a way that it interacts with the guiding assembly of the nacelle, thus the lifted radiator arrangement is passed to its final position on top of the nacelle by the engaged guiding assemblies.

Thus the guiding assembly of the radiator arrangement interacts with the guiding assembly of the nacelle and vice versa.

A protrusion may be used as guiding assembly on top of the nacelle. The protrusion is prepared to engage with a bottom part of the radiator. The bottom part of the radiator contains the guiding assembly of the radiator. Thus the radiator is positioned on top of the nacelle directly by the crane. There is no longer the need that personal has to leave the nacelle to direct the radiator on top of the nacelle.

Preferably the nacelle contains openings, which are used to attach and to direct cooling-cables between the radiator and the cooling-equipment inside the nacelle.

Preferably the guiding assembly of the nacelle and the guiding assembly of the radiator contain connection means, which are constructed and positioned in a way, that they can be connected from the inside of the nacelle. Thus there is no longer the need that personal has to leave the nacelle for connection purposes.

If necessary a wire or a rope may be attached to the radiator to guide it into the intended position on top of the nacelle. This work is done preferably by personal acting on the ground. It is also possible that this is done by personal acting from the inside of the nacelle, thus the opening of the nacelle might be used for this purpose, too.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
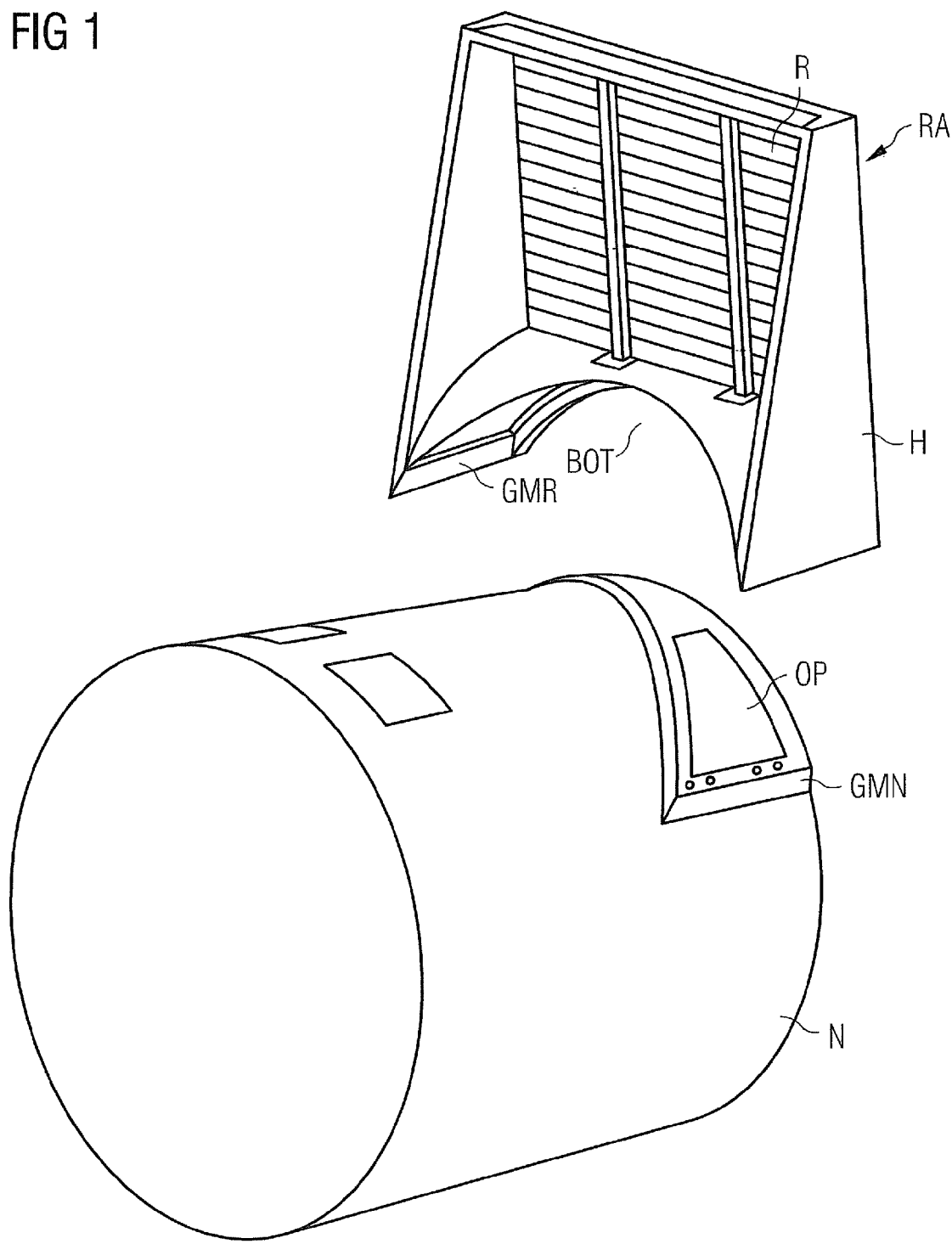
FIG. 1 shows the arrangement according to the invention.

FIG. 1 shows the arrangement according to the invention.

A radiator arrangement RA contains a radiator R and a housing H. The housing H is preferably made of glass-fibre. The bottom BOT of the radiator arrangement RA contains guiding means GMR.

The nacelle N contains a protrusion, which is used as guiding means GMN of the nacelle N. The guiding means GMN is prepared to engage with the guiding means GMR of the radiator arrangement RA.

The nacelle N is preferably made of glass-fibre.

The guiding means GMN of the nacelle N contain an opening OP, which is used to direct the radiator arrangement RA to its final position and which is also used to accommodate cables and parts of a cooling-system.

While the radiator arrangement RA is positioned on top of the nacelle N an easy access is ensured from the inside of the nacelle N. Thus all work, which is needed for the positioning and for the connection of the radiator arrangement RA with the nacelle N is done from inside the nacelle N1.

Figure 2:
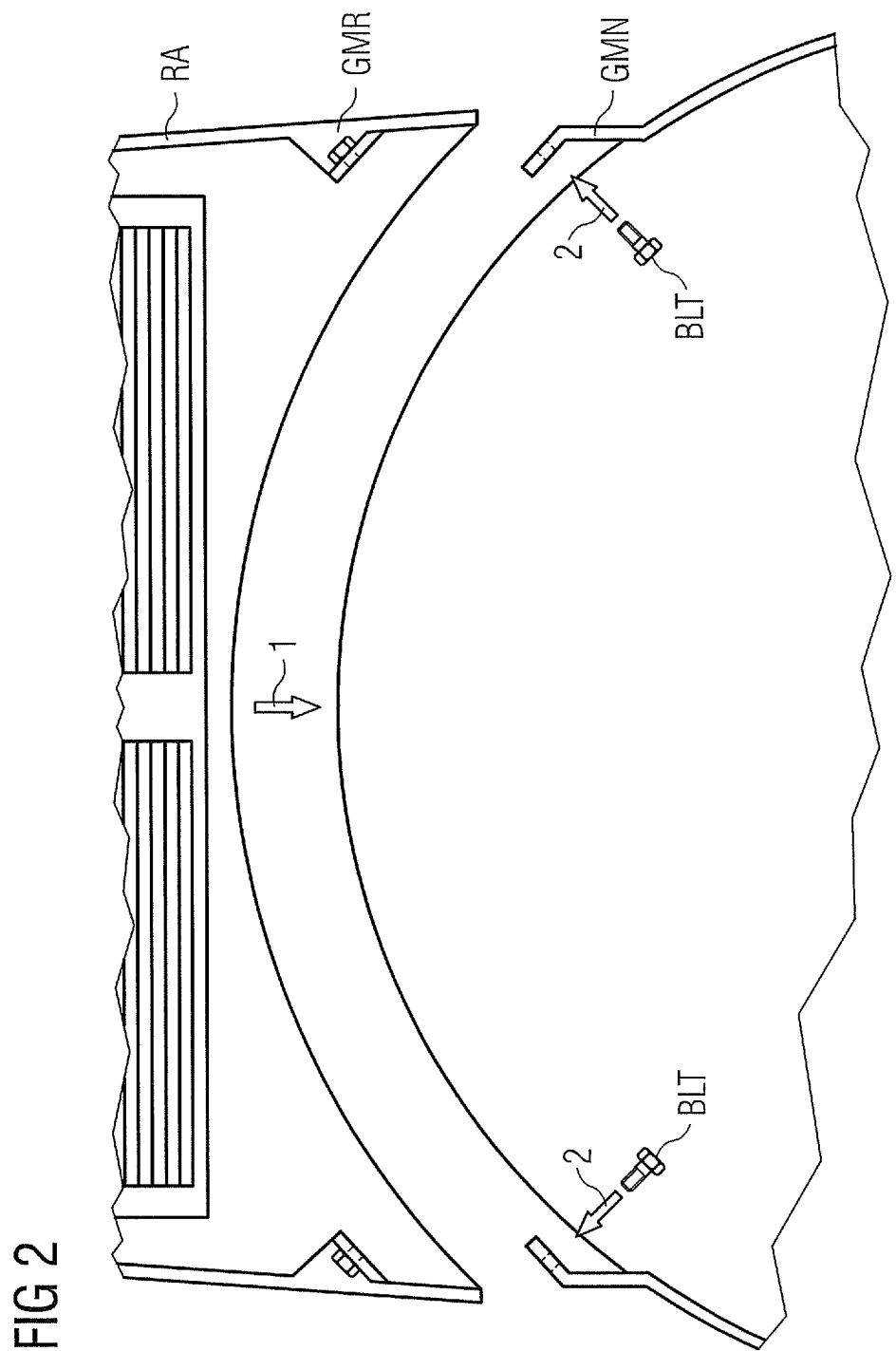
FIG. 2 shows a connection detail in reference to FIG. 1.

FIG. 2 shows a detail in reference to FIG. 1. The guiding means GMR of the radiator arrangement RA and the guiding means of the nacelle GMN are connected by bolts BLT for example. The bolts BLT may be applied from the inside of the nacelle N1, so there is no need for personal to leave the nacelle N1 for this work.

Thus the bolts BLT are positioned and fastened from the inside of the nacelle.

Figure 3:
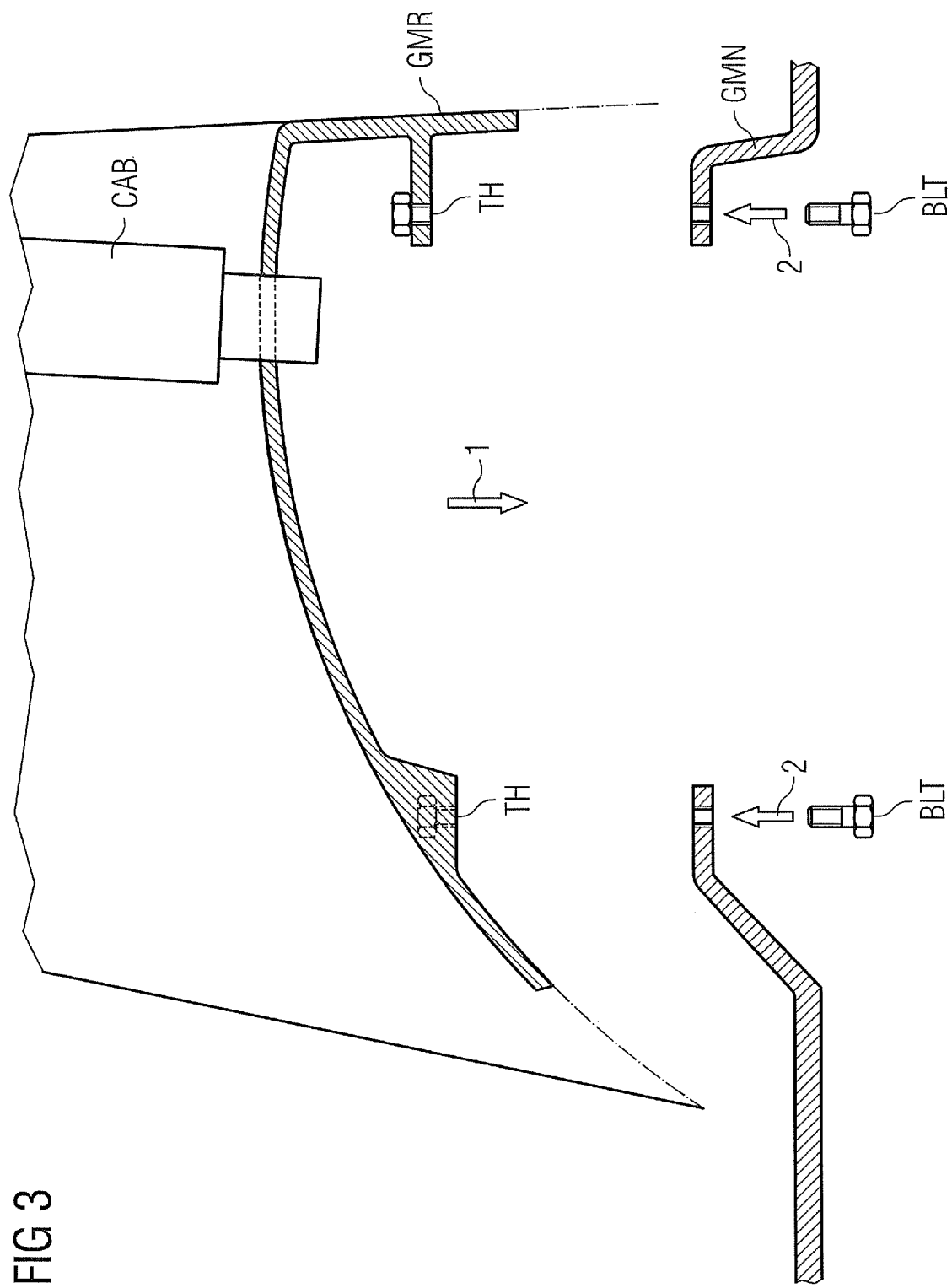
FIG. 3 shows another detail in reference to FIG. 1 and FIG. 2.

FIG. 3 shows another detail in reference to FIG. 1 and FIG. 2.

Connection means CAB are contained within the radiator arrangement RA. They are used for the connection of cooling hoses, tubes, pipes, etc. to the radiator.

Threaded holes TH are used asides the guiding means GMR of the radiator arrangement RA to interact with the bolts BLT.

The invention claimed is:

1. An arrangement for a wind turbine comprising:
   a nacelle including a first guiding assembly; and
   a radiator arrangement including a housing, the housing comprising a second guiding assembly positioned on a bottom portion of the housing,
   wherein the second guiding assembly of the radiator arrangement is positioned and constructed such that the second guiding assembly interacts with the first guiding assembly of the nacelle to lock the radiator arrangement in a final fixed position on a top of the nacelle, and
   wherein the radiator arrangement is aligned in the final fixed position by the interacting guiding assemblies, and
   wherein a vertical position of the radiator arrangement is non-adjustable once in the final fixed position.

2. The arrangement according to claim 1, wherein the first guiding assembly is a protrusion.

3. The arrangement according to claim 1, wherein the second guiding assembly and the first guiding assembly each contain connection means which are constructed and positioned such that they allow a connection from inside of the nacelle.

4. The arrangement according to claim 1, wherein the first guiding assembly includes openings which are used to direct the radiator arrangement to a final position.

5. The arrangement according to claim 3, wherein the first guiding assembly includes openings which are used to direct the radiator arrangement to the final position.

6. The arrangement according to claim 4, wherein the openings are used to connect the radiator arrangement and connection means which are positioned inside the nacelle.

7. The arrangement according to claim 5, wherein the openings are used to connect the radiator arrangement and the connection means which are positioned inside the nacelle.

8. A method for assembling an arrangement of a nacelle and a radiator arrangement for a wind turbine comprising, the method comprising:
   raising a radiator arrangement from a position below the nacelle to a position above the nacelle, the nacelle including a first guiding assembly, the radiator arrangement including a housing comprising a second guiding assembly positioned on a bottom portion of the housing;
   contacting the first guiding assembly on the nacelle with the second guiding assembly of the housing;
   positioning the radiator arrangement in a final fixed position on a top of the nacelle via securement or engagement of the first guiding assembly to or with the second guiding assembly.

9. The method of claim 8, wherein a vertical position of the radiator arrangement is non-adjustable once in the final fixed position.

10. The method of claim 9, wherein the first guiding assembly and the second guiding assembly each comprise a protrusion, and wherein the protrusions are secured to one another by a fastener.

* * * * *